United States Patent [19]

Coulthart et al.

[11] Patent Number: 4,641,102
[45] Date of Patent: Feb. 3, 1987

[54] RANDOM NUMBER GENERATOR

[75] Inventors: Kenneth B. Coulthart, Hackettstown; Robert C. Fairfield, Randolph; Robert L. Mortenson, Mountain Lakes, all of N.J.

[73] Assignee: AT&T Bell Laboratories, Murray Hill, N.J.

[21] Appl. No.: 641,913

[22] Filed: Aug. 17, 1984

[51] Int. Cl.$^4$ .................. H03K 13/00; H03B 29/00
[52] U.S. Cl. ........................... 328/62; 331/78; 307/480; 377/46; 377/54
[58] Field of Search ............ 331/78; 307/471, 271, 307/480, 479; 328/59, 60, 62, 34; 377/46, 54, 80, 81

[56] References Cited

U.S. PATENT DOCUMENTS 3,366,779  1/1968  Catherall et al. .................. 328/60
3,691,472  9/1972  Bohman .............................. 328/63
3,706,941 12/1972  Cohn .................................. 331/78

*Primary Examiner*—Stanley D. Miller
*Assistant Examiner*—Richard Roseen
*Attorney, Agent, or Firm*—David I. Caplan

[57] ABSTRACT

A random number generator (RNG) uses an edge-triggered D-type flip-flop with a high frequency square wave having an approximately 50 percent duty cycle connected to a data input terminal and a low frequency square wave connected to a clock input terminal, a five-state counter, five two-input AND gates, five exclusive-OR gates, and five shift registers. An essentially truly random number is generated at the RNG output terminals. Probability biases due to both variations in the 50 percent duty cycle of the data waveform and small amounts of cycle-to-cycle jitter of the clock waveform are effectively removed.

4 Claims, 3 Drawing Figures

RANDOM NUMBER GENERATOR

FIELD OF THE INVENTION

This invention relates to Random Number Generators (RNG's) and in particular to solid-state RNG's.

BACKGROUND OF THE INVENTION

One type of RNG uses a positive edge-triggered D-type flip-flop with a high frequency nominally 50 percent duty cycle square wave applied to the data input terminal and a low frequency square wave having cycle-to-cycle jitter which spans two full cycles of the high frequency wave applied to the clock input terminal. The random number is generated at the Q output terminal of the flip-flop. If the duty cycle is not exactly 50 percent, then the number generated is biased. If the jitter does not span two full cycles, there is bit-to-bit correlation in the output number. With either of these two conditions, a given bit can be determined with better than a 50 percent probability. Coupling of adjacent output signals of the flip-flop to a two-input exclusive-OR gate improves the randomness of the number generated if the duty cycle of the data waveform is different than 50 percent, but does not compensate for insufficient jitter in the clock waveform.

It is desirable to have a RNG which uses a positive edge-triggered D-type flip-flop with high and low frequency input signals which compensates for both duty cycle and jitter variations.

SUMMARY OF THE INVENTION

The present invention is directed to a Random Number Generator (RNG) which essentially comprises a sample and hold circuit having an output coupled to storage-gating means having first and second output terminals coupled to first and second input terminals, respectively, of an exclusive-OR gate. The RNG generates an essentially truly random number at the output terminal of the exclusive-OR gate.

The sample and hold circuit is adapted to detect the state of a signal applied to a first input terminal thereof at a point in time which is determined by the occurrence of a portion of a repetitive signal applied to a second input terminal thereof and to generate at an output terminal thereof a signal having a state which is representative of the state of the signal applied to the first input terminal. The state of the output signal of the sample and hold circuit is held until the preselected portion of the signal applied to the second input terminal reoccurs. The storage-gating means is adapted to store signals received from the sample and hold circuit and to effectively cause one of said stored signals to be applied to the first input terminal of the exclusive-OR gate and to cause another stored signal, other than one which occurred just before or just after the aforesaid stored signal, to be applied to the second input terminal of the exclusive-OR gate.

In a preferred embodiment, the sample and hold circuit is a D-type edge-triggered flip-flop having a data (D) input terminal which receives a high frequency square wave having an approximately 50 percent duty cycle and having a clock (C) input terminal which receives a low frequency square wave having cycle-to-cycle jitter which ideally covers two consecutive cycles of the high frequency square wave. The RNG of the preferred embodiment includes a five-state counter, five two-input AND gates, five two-input exclusive-OR gates, and five multistage shift registers. The five-state counter, which counts the clock pulses, has five output terminals with each coupled to a first input terminal of each of the five AND gates. A Q output terminal of the flip-flop is coupled to the first input terminals of the AND gates. The output terminal of each AND gate is coupled to the second input terminal of a separate one of five two-input exclusive-OR gates. An output terminal of each exclusive-OR gate is coupled to an input terminal of a separate one of five shift registers. The last stage of the first shift register is coupled to the first input terminal of the second exclusive-OR gate. The last stage of each successive shift register is connected to the first input terminal of the next successive exclusive-OR gate with the last stage of the fifth shift register being coupled to the first input terminal of the first exclusive-OR gate. RNG output terminals are connected to selected stages of each shift register. An essentially truly random number is generated at the RNG output terminals. Probability biases due to both variations in the 50 percent duty cycle of the data waveform and small amounts of cycle-to-cycle jitter of the clock waveform are effectively removed.

These and other features of the invention are better understood from a consideration of the following detailed description taken in conjunction with the accompanying drawings.

DETAILED DESCRIPTION

Figure 1:
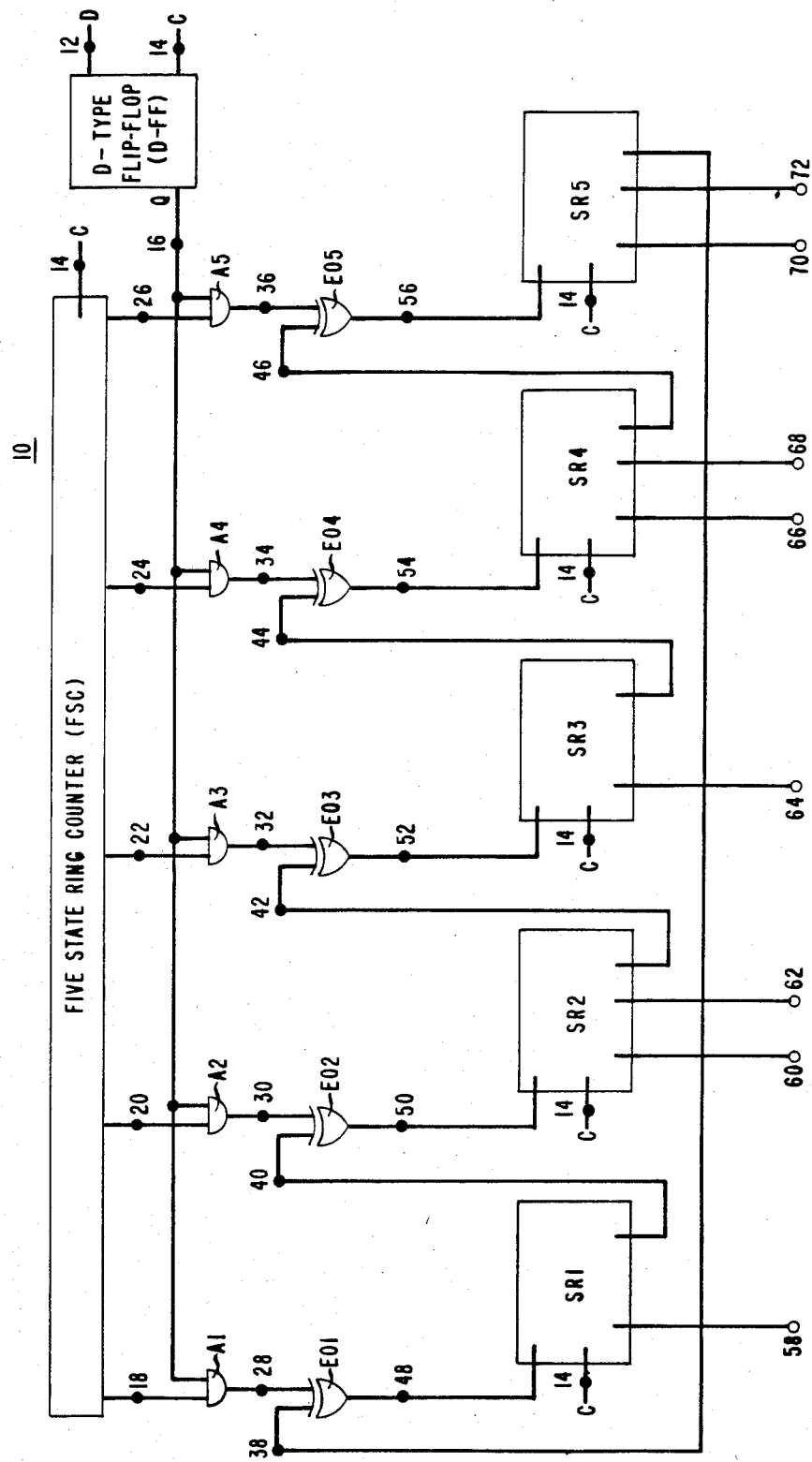
FIG. 1 illustrates a Random Number Generator (RNG) in logic block form in accordance with one embodiment of the present invention.

Referring now to FIG. 1, there is illustrated a Random Number Generator (RNG) 10 comprising a D-type edge-triggered flip-flop circuit D-FF (which may be denoted as a sample and hold circuit), a five-state counter (FSC), AND logic gates A1, A2, A3, A4, and A5, exclusive-OR logic gates EO1, EO2, EO3, EO4, and EO5, and shift registers SR1, SR2, SR3, SR4, and SR5 (which may be denoted as storage means). RNG 10 generates an essentially truly random 536 bit number accessed at output terminals 60, 62, 64, 66, 68, 70, 72, and 58. The shift registers and the AND logic gates may be denoted as gating-storage means. FSC and the AND logic gates may be denoted as gating means.

A relatively high frequency square wave having an approximately 50 percent duty cycle is applied to a terminal 12 which is coupled to a data input terminal D of D-FF. A relatively low frequency square wave is applied to a terminal 14 which is coupled to a clock input terminal C of D-FF and to clock input terminals C of FSC, SR1, SR2, SR3, SR4, and SR5. An output terminal Q of D-FF is coupled to a terminal 16 which is coupled to a second input terminal of each of A1, A2, A3, A4, and A5. If the high frequency square wave has an exactly 50 percent duty cycle, and if the low frequency square wave has significant phase jitter relative to the high frequency square, (i.e., significant cycle-to-cycle period variation such that the rising edge of the clock input signal can with equal likelihood be present when the data input signal is a "1" or a "0") each successively generated output signal (bit) occurring at terminal 16 is independent and has equal probability of being a "1" or a "0".

If the high frequency square wave has other than a 50 percent duty cycle then there occurs at terminal 16 a bias toward either a "1" or a "0". This bias can be effectively corrected if selected groups of output bits (signals) from terminal 16 are passed through an exclusive-OR chain. The logic components comprising FSC, A1, A2, A3, A4, and A5, EO1, EO2, EO3, EO4, and EO5, and SR1, SR2, SR3, SR4, and SR5 provide such an exclusive-OR chain. FSC has five output terminals which are coupled to nodes 18, 20, 22, 24, and 26, respectively. Nodes 18, 20, 22, 24, and 26 are coupled to a first input terminal of A1, A2, A3, A4, and A5, respectively. Output terminals of A1, A2, A3, A4, and A5 are coupled to nodes 28, 30, 32, 34, and 36, respectively. Nodes 28, 30, 32, 34, and 36 are coupled to a second input terminal of EO1, EO2, EO3, EO4, and EO5, respectively. Output terminals of EO1, EO2, EO3, EO4, and EO5 are coupled to nodes 48, 50, 52, 54, and 56, respectively. Nodes 48, 50, 52, 54, and 56 are coupled to one input of SR1, SR2, SR3, SR4, and SR5, respectively. A first output terminal of SR1 is coupled to a node 40 and to a first input terminal of EO2. A first output terminal of SR2 is coupled to a node 42 and to a first input terminal of EO3. A first output terminal of SR3 is coupled to a node 44 and to a first input terminal of EO4. A first output terminal of SR4 is coupled to a node 46 and to a first input terminal of EO5. A first output terminal of SR5 is coupled to a node 38 and to a first input terminal of EO1. An output terminal of SR1 is coupled to an RNG output terminal 58. Two output terminals of SR2 are coupled to RNG output terminals 60 and 62, respectively. An output terminal of SR3 is coupled to RNG output terminal 64. Two output terminals of SR4 are coupled to RNG output terminals 66 and 68, respectively. Two output terminals of SR5 are coupled to RNG output terminals 70 and 72, respectively.

In a preferred embodiment, SR1, SR2, SR3, and SR4 each contain 107 stages and SR5 contains 108 stages. Together, all of the SR's form an effective 536 stage shift register. The output terminals 58, 60, 62, 64, 66, 68, 70, and 72 are the 67th stage of SR1, the 27th and 94th stages of SR2, the 54th stage of SR3, the 14th and 81st stages of SR4, and the 41st and 108th stages of SR5.

FSC acts to count the number of clock pulses applied to input terminal 14 and provide a "1" output signal on one of nodes 18, 20, 22, 24, and 26, and a "0" on all the other nodes of this group. This "1" rotates from nodes 18 to 20 to 22, to 24, to 26 and then starts again at node 18 as clock pulses are received at input terminal 14. This allows only one of A1, A2, A3, A4, or A5 to receive a "1" on the respective first input terminal thereof which ensures that a bit received from the Q output terminal of D-FF onto each of the second input terminals of A1, A2, A3, A4, and A5 is recognized by only one of A1, A2, A3, A4, and A5. Assuming all of the SR's initially store "0's" in each stage, if node 18 is a "1", which occurs after a first clock pulse is counted by FSC, and node 16 is a "1", then node 28 is a "1". Nodes 30, 32, 34, and 36 are all "0's" since the first input of each is a "0". Since node 38 is "0" and node 28 is a "1", the output of EO1 (node 48) is a "1". This inserts a "1" into a first stage of SR1. If A1 receives a "0" instead of a "1", then node 28 is a "0" and node 48 becomes a "0". A bit introduced into SR1 causes the last bit to be shifted out of SR1 and same to become an input signal applied to the first input terminal (node 40) of EO2. A second clock pulse applied to FSC causes terminal 20 to be a "1" and effectively activates only A2. After 2680 bits have been generated at terminal 16 then all of the stages of SR1, SR2, SR3, SR4, and SR5 contain randomly generated bits which have been exclusively-ORed at least five time. The RNG output terminals are coupled to selected stages of each SR to provide 67 random eight bit numbers having the desired number of bits.

If the high frequency square waveform has a duty cycle of p and the number of bits independently exclusive-ORed is n, then the probability of obtaining a "1" or a "0" output bit is given by the below equations:

$$P(1) = \tfrac{1}{2} - 2^{n-1}(p - \tfrac{1}{2})^n \qquad (1)$$

$$P(0) = \tfrac{1}{2} + 2^{n-1}(p - \tfrac{1}{2})^n. \qquad (2)$$

If the duty cycle of the high frequency square wave is 60 percent and five exclusive-OR functions are performed, as RNG 10 of FIG. 1 provides, then the probability of obtaining a "1" output or a "0" output is:

$$P(1) = \tfrac{1}{2} - 2^{5-1}(0.6 - 0.5)^5 = 0.49984 \qquad (3)$$

$$P(0) = \tfrac{1}{2} + 2^{5-1}(0.6 - 0.5)^5 = 0.50016. \qquad (4)$$

As is apparent, the built-in bias of the 60 percent duty cycle bias towards an output "1" is effectively removed by the RNG 10 of FIG. 1. For the RNG 10 of FIG. 1, it takes $5 \times 536 = 2680$ clock cycles of the clock waveform to generate a bit in each position (stage) of the SR's which is the result of five nonadjacent D-FF output bits passed through an exclusive-OR chain.

If the low frequency pulse waveform has significant phase jitter relative to the high frequency square wave, each successively generated sample from D-FF is independent. That is, if the cycle-to-cycle jitter of the low frequency pulse waveform spans two full cycles of the sampled high frequency square wave, one cannot accurately predict the state of sample knowing the state of the preceding sample and the mean frequencies. On the other hand, if the jitter on the sampling pulse waveform extends over only a small fraction of the period, there will be sample-to-sample correlation and one can, with some degree of accuracy, predict the state of a sample having knowledge of the preceding sample's state and the mean frequencies. As with the duty cycle bias, the sample-to-sample correlation is effectively removed or corrected via the use of the combination FSC, A1, A2, A3, A4, and A5, EO1, EO2, EO3, EO4, and EO5, SR1, SR2, SR3, SR4, and SR5 of FIG. 1. The correlation correction is achieved as samples generated many clock cycles apart are passed through exclusive-ORs. In the circuit of FIG. 1, this exclusive-OR operation again takes place as samples from D-FF are fed into the respective shift registers at nodes 48, 50, 52, 54, and 56.

The magnitude of the correlation correction stems from the following. The standard deviation of the normal distribution which can be used to model the pulse waveform period variations is a direct measure of the jitter extent over the period of the high frequency square wave, i.e., the correlation between samples. The normal distribution has the important property that a linear change in the random variable (the period) results in a linear change in the standard deviation. If we consider samples taken ten cycles apart, as opposed to successive samples, the standard deviation of the tenth clock pulse with respect to the first clock pulse is tenfold the standard deviation given successive clock pulses. Thus, samples generated many clock cycles apart have low correlation and the lower the correlation of the samples passing through an exclusive-OR network, the lower the probability of predicting the output with any degree of certainty. In the RNG 10 of FIG. 1, the minimum time spacing actually used between samples exclusive-ORed together is 429 clock cycles.

Figure 2:
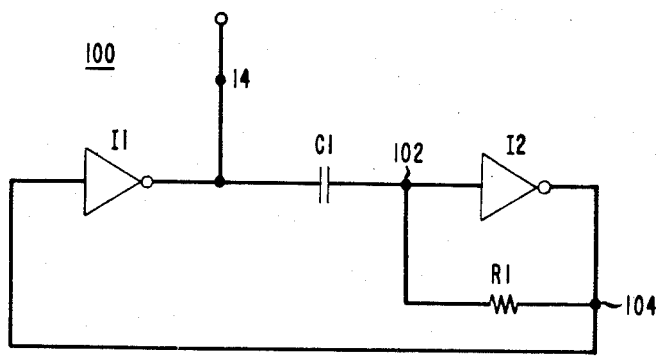
FIG. 2 illustrates a circuit which is useful with the RNG of FIG. 1.

Referring now to FIG. 2, there is illustrated an astable circuit 100 which produces at an output terminal 14 a digital signal which was used as the input signal applied to the clock (C) input terminal of RNG 10 of FIG. 1. Circuit 100 comprises inverter circuits I1 and I2, a resistor R1 and a capacitor C1. An output terminal of I1 is coupled to a first terminal of C1 and to terminal 14. A second terminal of C1 is coupled to a node 102, to a first terminal of a resistor R1, and to an input terminal of I2. An output terminal of I2 is coupled to an input terminal of I1, to a second terminal of R1, and to a node 104. Circuit 100, except for C1 and R1, was fabricated with RNG 10 of FIG. 1 on a single integrated circuit with the values of R1 and C1 being externally selected so as to produce a waveform having a frequency of 1 KHz. Circuit 100 is well known and its operation is documented.

Figure 3:
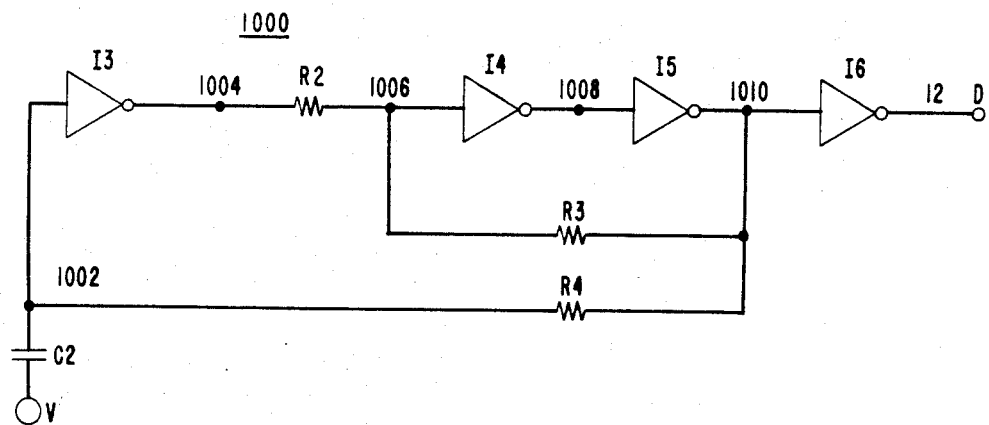
FIG. 3 illustrates another circuit which is useful with the RNG of FIG. 1.

Referring now to FIG. 3, there is illustrated a voltage pulse generator circuit 1000 which produces at an output terminal 12 a digital signal which was used as the input signal applied to the data (D) input terminal of RNG 10 of FIG. 1. Circuit 1000 comprises inverter circuits I3, I4, I5, and I6, resistors R2, R3, and R4, and a capacitor C2. First terminals of C2 and R4 are coupled to an input terminal of I3 and to a node 1002. An output terminal of I3 is coupled to a first terminal of R2 and to a node 1004. A second terminal of R2 is coupled to a first terminal of R3, to an input terminal of I4, and to a node 1006. An output terminal of I4 is coupled to an input terminal of I5 and to a node 1008. A second terminal of R3 is coupled to an output terminal of I5, to a second terminal of R4, to an input terminal of I6, and to a node 1010. An output terminal of I6 is coupled to a terminal 12. I6 is optional and is used essentially as a driver so as to isolate any load capacitance (not illustrated) coupled to terminal 12 such that the frequency of operation is relatively independent of any capacitive loading on terminal 12. If capacitive loading is light, then I6 can be eliminated. A second terminal of C2 is coupled to a voltage source which in a preferred embodiment is ground potential. The values of C2, R2, R3, and R4 were adjusted so as to produce a square wave having a frequency of 8 MHz. All of the circuitry of voltage pulse generator circuit 1000 was fabricated on a single integrated circuit with RNG 10 of FIG. 1 and astable circuit 100 of FIG. 2. Circuit 1000 is known and its operation is well documented.

The embodiments described are only intended to illustrate the general principles of the invention. Various modifications are possible within the spirit of the invention. For example, the total number of bits in all the shift registers can be modified, provided that each stage in the shift registers eventually contains a bit which is the product of the number of exclusive-ORing functions desired. Still further, a variety of sample and hold circuits can be substituted for the D-type flip-flop. Still further, the exclusive-ORing function provided by the five exclusive-OR gates of FIG. 1 can be effectively achieved with one two-input terminal exclusive-OR gate. Two non-adjacent signals from the flip-flop would initially be applied to the two-input terminals of this exclusive-OR gate and result in an output signal. The output signal is stored and the two-input signals are then removed. The stored output signal is then applied as a first input signal with a subsequent signal from the flip-flop serving as the second input signal. These two input signals are then exclusively ORed by the exclusive-OR gate and the process is repeated until there are five or as many exclusive-ORing products generated as desired. Still further, in some applications the exclusive-ORing of only two non-adjacent signals from a sample and hold circuit may provide a random enough number. A storage-gating means comprising a storage circuit for storing signals received from the sample and hold circuit and a gating circuit for determining which two stored signals are to be applied to an exclusive-OR gate is coupled between a sample and hold circuit and a two-input exclusive-OR gate. Still further, the five exclusive-OR gates could be configured with the output terminal of the first being coupled to the first input terminal of the second and the output terminal of each successive exclusive-OR gate being coupled to the first input terminal of the next exclusive-OR gate, except for the output terminal of the fifth exclusive-OR gate. Still further, the number of exclusive-ORing functions can be varied considerably for different applications.

What is claimed is:

1. Circuitry comprising:
a sample-and-hold circuit having first and second input terminals and an output terminal and being connected to detect successive levels of a signal applied to the first input terminal at points in time which are determined by occurrences of a preselected portion of a repetitive signal applied to the second input terminal and to generate at the output terminal sample-and-hold output signals which are representative of the levels of the signal applied to the first input terminal, each of the levels of the sample-and-hold output signal being held until the preselected portion of the signal applied to the second input terminal recurs;
a plurality of exclusive-OR gates each of which having first and second input terminals and an output terminal;
gating means having an input terminal coupled to the output terminal of the sample-and-hold circuit and having a plurality of output terminals with each one of same coupled to a separate second input terminal of one of the plurality of exclusive-OR gates;
the gating means being adapted to successively apply each of the sample-and-hold output signals to the second input terminal of a different one of each of the plurality of exclusive-OR gates;
a plurality of shift registers, each of the registers comprising a first and a last stage and having an input terminal coupled to the first stage thereof, and further having a first output terminal coupled to a last stage thereof;
the output terminal of each of the exclusive-OR gates being coupled to the input terminal of a separate one of the shift registers;
the first output terminal of a first of the shift registers being coupled to the first input terminal of a second of the exclusive-OR gates;

the first output terminal of each successive shift register being coupled to the first input terminal of the next successive exclusive-OR gate, with the first output terminal of the last shift register being coupled to the first input terminal of the first of the exclusive-OR gates; and circuitry output terminals being coupled to selected stages of the plurality of shift registers.

2. The circuitry of claim 1 wherein:

the gating means comprises an n-state ring counter and a plurality of AND gates, each of the AND gate having first and second input terminals and an output terminal;

the n-state ring counter has an input terminal coupled to the second input terminal of the sample-and-hold circuit and has a plurality of output terminals each of which is coupled to the second input terminal of a separate one of the AND gates; and the first input terminal of each AND gate is connected for receiving the sample-and-hold output signals, and the output terminal of each of the AND gates is coupled to a separate second input terminal of one of the exclusive-OR gates.

3. The circuitry of claim 2 wherein the sample and hold circuit is an edge-triggered D-type flip-flop with the first input terminal being a data input terminal and the second input terminal being a clock input terminal.

4. The circuitry of claim 3 wherein the n state ring counter is a five-state ring counter, there are five AND gates, five exclusive-OR gates, and five shift registers.

* * * * *